US008730840B2

(12) United States Patent
Banks et al.

(10) Patent No.: US 8,730,840 B2
(45) Date of Patent: *May 20, 2014

(54) NODE DEVICE COOPERATING WITH SWITCH WHICH IMPLEMENTS ZONES IN A FIBRE CHANNEL SYSTEM

(75) Inventors: David Banks, Pleasanton, CA (US); Kumar Malavalli, Los Altos, CA (US); Paul Ramsay, Fremont, CA (US); Kha Sin Teow, San Jose, CA (US); Jieming Zhu, Fremont, CA (US)

(73) Assignee: Polycom, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/601,466

(22) Filed: Aug. 31, 2012

(65) Prior Publication Data

US 2012/0320799 A1    Dec. 20, 2012

Related U.S. Application Data

(60) Continuation of application No. 11/748,612, filed on May 15, 2007, now Pat. No. 8,279,775, which is a division of application No. 10/780,147, filed on Feb. 17, 2004, now Pat. No. 7,283,486, which is a continuation of application No. 09/426,567, filed on Oct. 22, 1999, now Pat. No. 6,765,919.

(60) Provisional application No. 60/105,423, filed on Oct. 23, 1998.

(51) Int. Cl.
*H04L 12/70* (2013.01)

(52) U.S. Cl.
USPC .......................................... 370/254; 370/255

(58) Field of Classification Search
CPC ............ H04L 61/1505; H04L 61/1541; H04L 61/6045; H04L 41/12; H04L 41/0893
USPC ........................................................ 370/254
See application file for complete search history.

(56) References Cited

U.S. PATENT DOCUMENTS

| | | | |
|---|---|---|---|
| 5,049,873 A * | 9/1991 | Robins et al. ................. | 370/254 |
| 5,185,860 A * | 2/1993 | Wu ............................... | 709/224 |
| 5,260,933 A | 11/1993 | Rouse | |
| 5,329,579 A | 7/1994 | Brunson | |
| 5,351,295 A | 9/1994 | Perlman et al. | |
| 5,371,897 A | 12/1994 | Brown et al. | |
| 5,394,402 A | 2/1995 | Ross | |
| 5,413,411 A | 5/1995 | Ebersohl | |

(Continued)

OTHER PUBLICATIONS

FC-GS (ANSI, "Fibre Channel—Generic Services (FC-GS)", Draft Proposal, Revision 3.1, Aug. 7, 1996, 100 pages).*

(Continued)

*Primary Examiner* — Ayaz Sheikh
*Assistant Examiner* — Tarell Hampton
(74) *Attorney, Agent, or Firm* — Wong, Cabello, Lutsch, Rutherford & Brucculeri, L.L.P.

(57) ABSTRACT

In a system comprising a first fabric and a plurality of devices coupled to the fabric by Fiber Channel connections, the devices are logically grouped to form configurations and zones. A configuration includes at least one zone, and each zone includes at least one device as a member of the zone. Communications between the devices is restricted according to the configuration currently in effect. For example, one device may be permitted to communicate with another device only if they are members of a common zone.

16 Claims, 4 Drawing Sheets

(56) References Cited

U.S. PATENT DOCUMENTS

| | | |
|---|---|---|
| 5,442,791 A | 8/1995 | Wrabetz et al. |
| 5,473,599 A | 12/1995 | Li et al. |
| 5,519,695 A | 5/1996 | Purohit et al. |
| 5,574,860 A | 11/1996 | Perlman et al. |
| 5,600,664 A | 2/1997 | Hayashi |
| 5,610,745 A | 3/1997 | Bennett |
| 5,633,922 A | 5/1997 | August et al. |
| 5,687,168 A | 11/1997 | Iwata |
| 5,748,612 A | 5/1998 | Stoevhase et al. |
| 5,751,715 A | 5/1998 | Chan et al. |
| 5,752,003 A | 5/1998 | Hart |
| 5,774,656 A | 6/1998 | Hattori et al. |
| 5,805,924 A | 9/1998 | Stoevhase |
| 5,844,887 A | 12/1998 | Oren et al. |
| 5,872,822 A | 2/1999 | Bennett |
| 5,878,232 A | 3/1999 | Marimuthu |
| 5,894,481 A | 4/1999 | Book |
| 5,938,732 A | 8/1999 | Lim et al. |
| 5,944,798 A | 8/1999 | McCarty et al. |
| 5,946,311 A | 8/1999 | Alexander et al. |
| 5,956,665 A | 9/1999 | Martinez et al. |
| 5,968,126 A | 10/1999 | Ekstrom et al. |
| 6,000,020 A | 12/1999 | Chin et al. |
| 6,021,429 A | 2/2000 | Danknick |
| 6,041,058 A | 3/2000 | Flanders et al. |
| 6,079,020 A | 6/2000 | Liu |
| 6,147,976 A | 11/2000 | Shand et al. |
| 6,212,552 B1 | 4/2001 | Biliris et al. |
| 6,308,218 B1 | 10/2001 | Vasa |
| 6,353,612 B1 | 3/2002 | Zhu et al. |
| 6,374,302 B1 | 4/2002 | Galasso et al. |
| 6,401,128 B1 | 6/2002 | Stai et al. |
| 6,665,733 B1 | 12/2003 | Witkowski et al. |
| 6,765,919 B1 | 7/2004 | Banks et al. |
| 2001/0011333 A1 | 8/2001 | Sanada et al. |
| 2002/0007445 A1 | 1/2002 | Blumenau et al. |
| 2002/0010813 A1 | 1/2002 | Hoese et al. |
| 2002/0052986 A1 | 5/2002 | Hoese et al. |
| 2002/0062222 A1 | 5/2002 | Gupta et al. |
| 2003/0095549 A1 | 5/2003 | Berman |
| 2004/0028038 A1 | 2/2004 | Anderson et al. |

OTHER PUBLICATIONS

Fibre Channel Physical and Signaling Interface (FC-PH), Rev. 4.3, working draft proposed American National Standard for Information Systems, Jun. 1, 1994, 479 pages.

Fibre Channel Switch Fabric (FC-SW), Rev 3.3, NCITS working draft proposed American National Standard for Information Technology, Oct. 21, 1997, 108 pages.

Fibre Channel Fabric Generic Requirements (FC-FG), Rev. 3.5, working draft proposed American National Standard for Information Systems, Aug. 7, 1996; 35 pages.

Fibre Channel Fabric Loop Attachment (FC-FLA), Rev. 2.7, NCITS working draft proposed Technical Report, Aug. 12, 1997; 136 pages.

Fibre Channel Generic Services—2 (FC-GS-2), Rev. 5.3, NCITS working draft proposed American National Standard for Information Technology, Nov. 25, 1998; 106 pages.

Fibre Channel—Arbitrated Loop (FC-AL), American National Standard for Information Systems, Apr. 8, 1996, 102 pages.

* cited by examiner

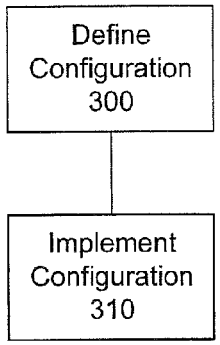
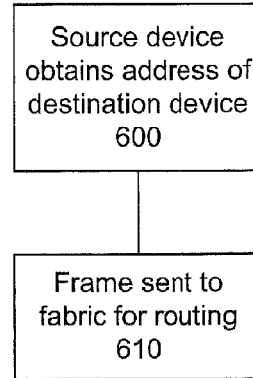
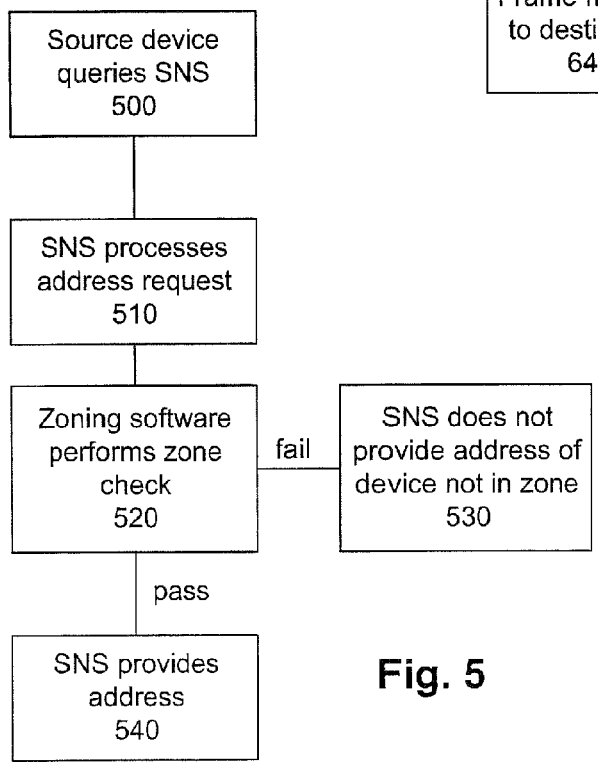
Fig. 3
Fig. 6
Fig. 5

NODE DEVICE COOPERATING WITH SWITCH WHICH IMPLEMENTS ZONES IN A FIBRE CHANNEL SYSTEM

CROSS-REFERENCE TO RELATED APPLICATION

This application is a continuation of U.S. patent application Ser. No. 11/748,612, filed May 15, 2007, which is a division of U.S. patent application Ser. No. 10/780,147, filed Feb. 17, 2004, now U.S. Pat. No. 7,283,486, which is a continuation of U.S. patent application Ser. No. 09/426,567, filed Oct. 22, 1999, now U.S. Pat. No. 6,765,919, which claims the benefit of U.S. Provisional Patent Application Ser. No. 60/105,423, "Zoning", by David Banks, Kumar Malavalli, Paul Ramsay, Kha Sin Teow, and Jieming Zhu, filed Oct. 23, 1998, all of which are incorporated herein by reference.

BACKGROUND OF THE INVENTION

1. Field of the Invention

This invention relates generally to a method for creating and implementing zones within a network communication system, and more particularly to a method for creating and implementing such zones for devices within a network communication system using Fibre Channel connections.

2. Description of the Related

As the result of continuous advances in technology, particularly in the area of networking such as the Internet, there is an increasing demand for communications bandwidth. For example, the transmission of data over a telephone company's trunk lines, the transmission of images or video over the Internet, the transfer of large amounts of data as might be required in transaction processing, or videoconferencing implemented over a public telephone network typically require the high speed transmission of large amounts of data. As applications such as these become more prevalent, the demand for communications bandwidth capacity will only increase.

Fibre Channel is a transmission medium that is well-suited to meet this increasing demand, and the Fibre Channel family of standards (developed by the American National Standards Institute (ANSI)) is one example of a standard which defines a high speed communications interface for the transfer of large amounts of data via connections between a variety of hardware devices, including devices such as personal computers, workstations, mainframes, supercomputers, and storage devices. Use of Fibre Channel is proliferating in many applications, particularly client/server applications which demand high bandwidth and low latency I/O. Examples of such applications include mass storage, medical and scientific imaging, multimedia communications, transaction processing, distributed computing and distributed database processing applications.

In one aspect of the Fibre Channel standard, the communications between devices is based on the use of a fabric. The fabric is typically constructed from one or more Fibre Channel switches and each device (or group of devices, for example, in the case of loops) is coupled to the fabric. Devices coupled to the fabric are capable of communicating with every other device coupled to the fabric.

However, there are situations where the ability to freely communicate between all devices on a fabric is not desirable. For example, it may be desirable to screen off certain devices on a fabric in order to perform testing and/or maintenance activities on only those devices, without risking interfering with the other devices on the fabric. Alternately, devices may be segregated according to use. For example, the devices coupled to the fabric may be segregated in one fashion during normal operation and in another fashion to facilitate back-ups or system maintenance. As another example, different levels of security may be enforced by allowing only certain sets of devices to communicate with each other. As a final example, devices may be segregated according to operating system or other technical features.

Conventional Fibre Channel fabric topologies do not allow the logical segregation of devices which are coupled to the same fabric. Rather, devices can be prevented from communicating with each other typically only if they are actually physically separated (e.g., coupled to different fabrics). However, this method does not facilitate the dynamic re-configuration of connections between devices since each re-configuration requires a physical recoupling of devices.

Thus, there is a need to configure a fabric so as to restrict communications between sets of devices connected to the fabric. There is further a need to be able to dynamically re-configure the fabric and to support multiple configurations of device connections.

SUMMARY OF THE INVENTION

In accordance with the present invention, a method is for use in a system comprising a first fabric and a plurality of devices coupled to the first fabric by Fibre Channel connections. The method is for logically organizing the devices and includes the following steps. A definition of a first configuration is accessed. The first configuration includes at least one zone, and each zone includes at least one device as a member of the zone. Responsive to the definition of the first configuration, communications between the devices coupled to the first fabric is restricted. The first configuration may be an effective one of a plurality of configurations. The members of each zone may be identified in a number of ways, including by the port on the fabric to which the member device is coupled, by a name for the device which is independent of the device's location on the fabric, or by an arbitrated loop physical address.

In one embodiment, communications between devices are restricted as follows. When a first device queries for the address of a second device, the address is returned only if the first and second device are members of a common zone. This prevents the first device from learning the addresses of other devices connected to the fabric but not within a common zone with the first device. Alternately or additionally, communications may be restricted by blocking communications between devices if they are not members of a common zone. In another aspect of the invention, at least one zone is characterized by a type of communication, such as read-only access or a specific communications protocol, and communications within that zone are restricted to the specified type of communication.

In another aspect of the invention, zoning configuration information is stored within the fabric itself and/or the zoning functionality is implemented by the fabric. Additionally, the zoning configuration information and/or zoning functionality may be distributed among the individual fabric elements which make up the fabric.

In another aspect of the invention, a fabric element includes a plurality of ports, a storage medium, and a logic device coupled to each of the foregoing. Each port is adapted to be coupled to a device by a Fibre Channel connection. The storage medium is for storing a definition of the first configuration. The logic device restricts communications for devices coupled to the plurality of ports, responsive to the definition of the first configuration.

In yet another aspect of the invention, zoning is implemented by software.

Zoning is advantageous because it overcomes many of the limitations of completely open connectivity between all devices coupled to the fabric. Zoning allows for the creation of segmentation or zones within a fabric. This allows the devices coupled to the fabric to be subdivided into logical groups of devices without the need to physically re-configure the network. Zones may be used to create different user groups, test and maintenance areas, and/or security barriers between devices. Zones are dynamic and can be easily and quickly changed to suit varying network needs.

BRIEF DESCRIPTION OF THE DRAWINGS

The present invention has other advantages and features which will be more readily apparent from the following detailed description of the invention and the appended claims, when taken in conjunction with the accompanying drawings, in which:

FIG. 3 is a flow diagram of a method of zoning in accordance with the present invention;

FIG. 5 is a flow diagram of a preferred method of zoning based on the Simple Name Server (SNS); and FIG. 6 is a flow diagram of another preferred method of zoning.

DETAILED DESCRIPTION OF THE PREFERRED EMBODIMENTS

Figure 1:
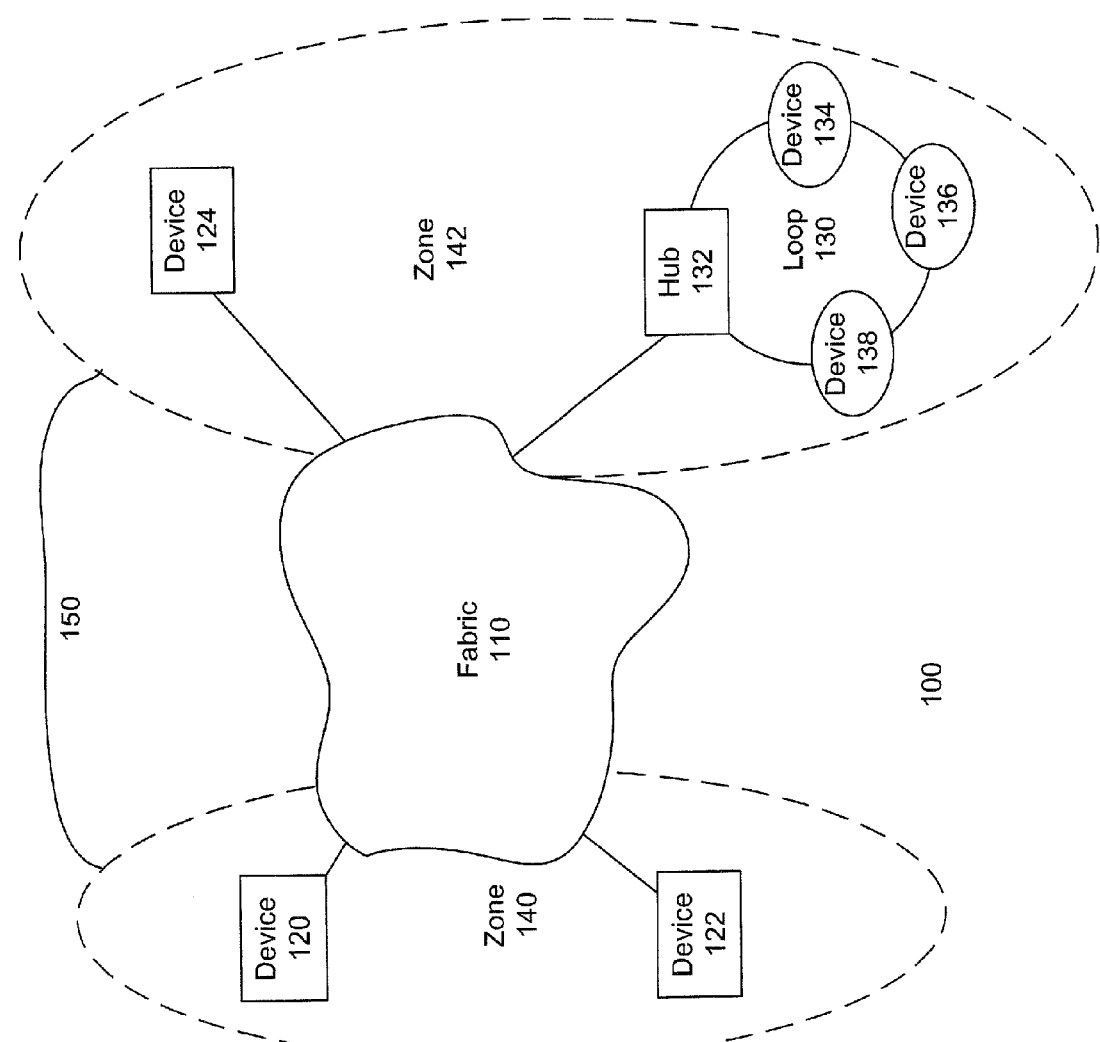
FIG. 1 is a diagram of a Fibre Channel network communication system 100 utilizing zoning in accordance with the present invention.

FIG. 1 is a diagram of a Fibre Channel network communication system 100 utilizing zoning in accordance with the present invention. As used herein, the term "Fibre Channel" refers to the Fibre Channel family of standards as well as other flexible, expandable network connectivity systems capable of moving data over long distances and supporting a variety of protocols. The Fibre Channel network communication system 100 comprises a fabric no and a plurality of devices 120, 122, and 124 and/or groups of devices 130. Fabric no is coupled to the various devices 120, 122, 124, and 130, and acts as a switching network to allow the devices to communicate with each other.

In the examples which follow, fabric no is a Fibre Channel network made up of one or more interconnected Fibre Channel switches (not shown in FIG. 1, although the invention is not limited to such fabrics or to Fibre Channel. Devices 120, 122, 124 may be any type of device, such as a computer or a peripheral, and are coupled to the fabric 110 using a point-to-point topology. Fabric 110 is also coupled to loop 130. Loop 130 includes a hub 132 and devices 134, 136, and 138, which are coupled in a loop topology. In a preferred embodiment, the loop 130 comprises an arbitrated loop with ring connections for providing multiple nodes with the ability to arbitrate access to a shared bandwidth.

In FIG. 1, Fibre Channel system 100 includes two zones 140 and 142. Zone 140 contains device 120 and device 122. Zone 142 contains device 124 and loop 130. Devices within the same zone may communicate with each other. Thus, for example, devices 120 and 122 may communicate with each other because they are both members of zone 140. Likewise, device 124 and loop 130 may communicate with each other because they are both members of zone 142. However, device 124 cannot communicate with device 120 because device 124 and device 120 are not members of a common zone. Similarly, device 124 cannot communicate with device 122; and loop 130 cannot communicate with either device 120 or device 122.

Zone 140 and zone 142 may be designated to be in effect at separate times or at the same time. If zones 140 and 142 are in effect at the same time, they would constitute a zone configuration 150. When a zone configuration is in effect, all zones that are members of that configuration are in effect.

Figure 2:
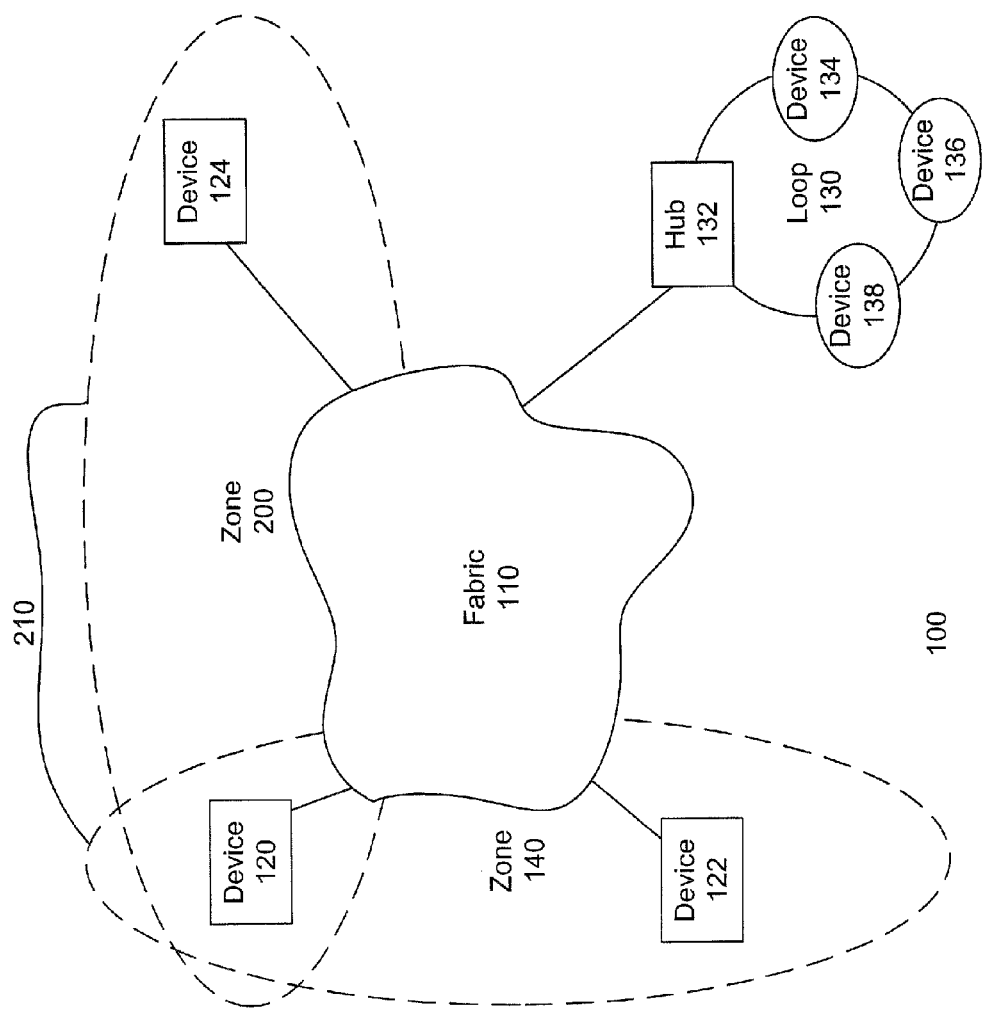
FIG. 2 is a diagram of system 100 utilizing a second example of zoning.

FIG. 2 is a diagram of system 100 illustrating another example configuration 210. Configuration 210 includes zones 140 and 200. Zone 140 is as defined in FIG. 1. Zone 200 includes devices 120 and 124. A device may be a member of more than one zone concurrently, as shown by device 120 which is a member of both zone 140 and zone 200. Device 120 may communicate with both device 122 and device 124. However, device 122 may not communicate directly with device 124, and vice versa. Furthermore, in configuration 210, loop 130 may not communicate with any of the devices 120, 122, or 124.

Note that zone configurations 150 and 210 may be stored and recalled at various times, thus facilitating the implementation of zones. For example, configuration 150 may be the configuration which is normally in effect because devices 120 and 122 are used by one group of people and device 124 and loop 130 are used by another group. Configuration 210 may be used when loop 130 requires servicing. Note that in configuration 210, loop 130 is isolated from the other devices, which would minimize any disruption to devices 120, 122, and 124; and devices 120 and 124 are zoned together, perhaps because device 120 serves as a temporary substitute to loop 130.

FIG. 3 is a flow diagram of a method of zoning in accordance with the present invention. In step 300, a zone configuration is defined. For example, in FIG. 1, zone configuration 150 would be defined to include zones 140 and 142, each of which is defined to include their respective devices. As noted above, any zones which are in effect at the same time make up a zone configuration. Hence, defining a zone inherently also defines a zone configuration (i.e., the configuration consisting of the defined zone); so step 300 is not intended to require the explicit definition of a configuration. For example, in FIG. 1, supposed that there was only one zone: zone 140. Defining zone 140 would also define the configuration including zone 140. In step 310, the zoning configuration is implemented. As described previously, implementation of a configuration restricts communications between devices according to the zones in the configuration.

Zoning is beneficial for a number of reasons. For example, it allows for greater flexibility in managing a network. In one application, different zones could be defined for different user groups with each zone set up to meet the needs of the corresponding user group. Zoning can also be used to set up barriers between different operating environments, to deploy logical fabric subsets by creating closed user groups, or to create test and maintenance areas that are separate from the rest of the fabric. Zoning allows the network to be subdivided for these and other purposes in a dynamic fashion and without the need to restructure the physical configuration of the network. This makes logically separating devices from each other faster, safer and easier.

Figure 4:
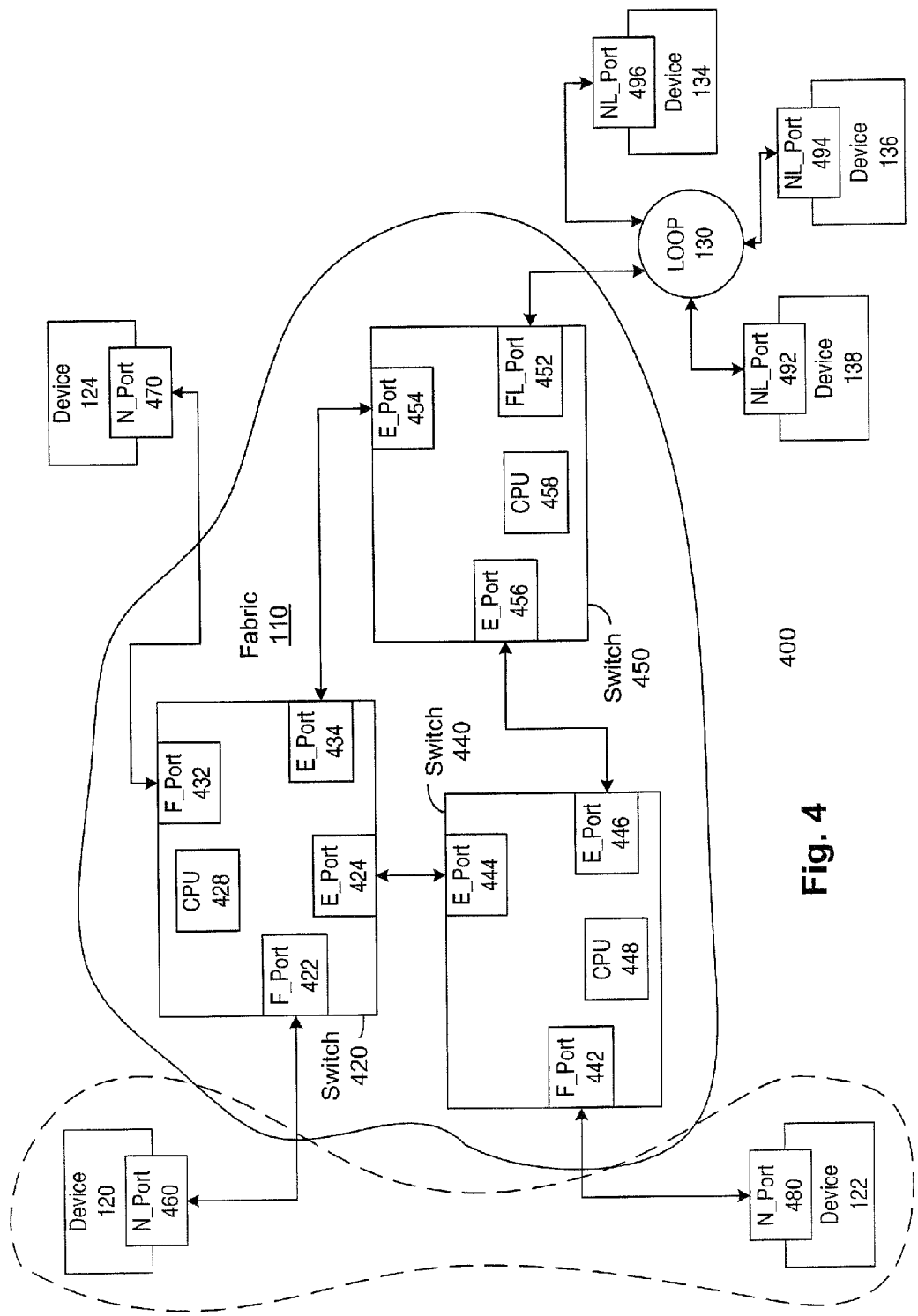
FIG. 4 is a diagram of a preferred embodiment 400 of Fibre Channel system 100 utilizing zoning.

Zoning may be implemented in a variety of different ways and FIGS. 4-6 illustrate two preferred embodiments for implementing zoning within a Fibre Channel system. FIG. 4 is a diagram of a preferred embodiment 400 of Fibre Channel system 100 utilizing zoning. FIG. 4 shows further details of the fabric no, devices 120, 122 and 124, and loop 130. Fabric no is comprised of three fabric elements 420, 440 and 450, preferably Silkworm switches series 2100, 2400, or 2800 manufactured by Brocade. Each switch 420, 440 and 450 contains ports to which devices may be coupled. In a preferred embodiment, these ports are implemented on Application Specific Integrated Circuits (ASICs) that may be plugged into or removed from a switch, thus allowing modularity regarding what ports are supported by each switch. Different types of ports support different types of connections from devices to a switch. An F_Port is a label used to identify a port of a fabric that is used to directly couple the fabric to a single device, such as a computer or peripheral. An FL_Port is a label used to identify a port of a fabric that is used to couple the fabric to a loop. The F_Port and the FL_Ports shall be referenced jointly as Fx_Ports. An E_Port is a label used to identify an inter-switch expansion port used to connect to an E_Port of another switch in order to build a larger switch fabric.

For this example, the relevant ports on switch 420 are F_Ports 422 and 432 and E_Ports 424 and 434. Similarly, switch 440 contains an F_Port 442 and E_Ports 444 and 446. Switch 450 contains an FL_Port 452 and two E_Ports 454 and 456. Switch 420 is coupled to switch 450 via E_Ports 434 and E_Port 454. Switch 450 is coupled to switch 440 via E_Port 456 and E_Port 446. Switch 440 is coupled to switch 420 via E_Port 444 and E_Port 424.

Devices coupled to the fabric are also identified as ports. An N_Port is a label used to identify a device coupled to the fabric. Device 120 is coupled to switch 420 via N_Port 460 and F_Port 422; device 124 is coupled to switch 420 via N_Port 470 and F_Port 432; and device 122 is coupled to switch 440 via N_Port 480 and F_Port 442. An NL_Port is a label used to identify a device which is coupled to the fabric using a loop topology. Devices 134, 136, and 138 are coupled to loop 130 via NL_Ports 496, 494 and 492, respectively. Loop 130, in turn, is coupled to switch 450 via FL_Port 452. The N_Ports and the NL_Ports shall be referenced jointly as Nx_Ports.

Each switch 420, 440 and 450 also contains an embedded central processing unit (CPU) module 428, 448 and 458 which controls the switch. These CPU modules typically include some sort of processor as well as local memory. As part of this control, each embedded CPU module 428, 448 and 458 provides support to its associated switch for operating a Simple Name Server (SNS) module. The SNS in a fabric provides address information to devices about other devices connected to the fabric. As part of the Fibre Channel standard, Nx_Ports joining a fabric typically must register their Fibre Channel attributes with the SNS. They typically also query the SNS for address information and attributes of other devices (e.g., other Nx_Ports) on the fabric. In response, the SNS provides an address list of other devices on the fabric. If address information changes at a later time, for example due to zoning changes, the fabric sends a change signal to each device to instruct them to requery the SNS for updated address information.

It should be understood that the examples discussed herein are purely illustrative. For example, referring to FIG. 4, fabric 110 may be comprised of a single switch or large numbers of switches. Other E_Port connection combinations could be used to couple the switches 420, 440, and 450 together to form fabric no. Similarly, other number and types of ports may be contained within each switch. The composition of configurations 150 and 210 from FIGS. 1 and 2, and of the zones within these configurations is also merely illustrative.

FIG. 5 is a flow diagram of a preferred method of implementing zoning based on the Simple Name Server (SNS). Additional zoning software is added to the existing SNS addressing functions to implement zoning. This zoning software loads zoning configuration information in the form of a database into the CPU of each switch. The zoning configuration database is replicated and propagated to each individual fabric switch. For example, referring to the example of FIG. 4, each switch 420, 440 and 450 would have a copy of the information defining configurations 150 and 210. The SNS will use this zoning configuration information to determine which devices are allowed to communicate with each other under the zoning configuration in effect. Since each switch maintains its own copy of the zoning information, a single switch failure will not interrupt zoning enforcement to other devices on the fabric.

In step 500, a device attached to the fabric queries the SNS regarding address information for other devices attached to the fabric. This typically occurs, for example, when a device is first coupled to the fabric in order for the device to determine what other devices are attached to the fabric. If the addressing information contained in the SNS or the zoning information changes, the SNS sends a signal to all devices instructing them to requery 500 the SNS for updated address information. In FIG. 4, when device 122 first attaches to the fabric no, device 122 may query 500 the SNS (which is implemented as software running on CPU 448) to learn what other devices are also attached to fabric 110. This information is provided as a table of addresses with which device 122 may communicate. If the zoning configuration for the fabric no changes, device 122 will receive a signal from the SNS instructing it to re-load the address database, in which case device 122 will repeat step 500.

In step 510, the SNS processes the request for information under standard SNS operating procedures. In the current example, in response to device 122's queries, an SNS without zoning capability would identify devices 120 and 124 and loop 130 as being attached to the fabric no, and would return the addresses of all of these devices. Device 122 would then have the addresses of these other devices and would be able to communicate with them.

However, a fabric with the zoning software enabled performs an additional feature. If a zone configuration is enabled in the fabric no, the SNS does not automatically send back a list of all devices connected to the fabric no. Rather, in step 520, a zone check is performed. The zoning software uses the zoning configuration information to determine which devices share a common zone. Each device address to be provided to another device requesting an address update is checked to ensure the two devices share a common zone. The SNS replies in step 540 only with the addresses of those devices sharing a common zone with the requesting device. The addresses of devices which are not in the same zone as the requesting device are not returned as shown in step 530 and, therefore, the requesting device does not know that these other devices exist. This effectively makes devices not within the same zone invisible to each other, although they are still connected to the same fabric.

Continuing the current example, assume that configuration 150 is in effect. In response to device 122's query for a list of all devices attached to fabric 110, the SNS would reply 540 only with the identity of device 120 since it is the only device sharing a zone with device 122. The addresses of device 124 and loop 130 would be eliminated during the zone check 520 and therefore would not be included on the list of addresses sent to device 122 in step 530. Hence, device 122 would not know about device 124 or loop 130, making it more difficult for device 122 to communicate with those devices. Without device 124's address, device 122 cannot send messages to device 124. On the other hand, if the SNS provides to device 122 the correct address for a destination device, device 122 may send messages via the fabric no to that destination device.

In this embodiment, the functions performed by the SNS change depending on whether or not zoning is implemented. However, the SNS protocol itself and the manner in which the devices query the SNS are not changed by the implementation of zoning. In other words, the various devices query the SNS in the same manner, regardless of whether zoning is implemented. Zoning is implemented entirely by changing the SNS's responses to the queries. This is advantageous because no change is required in the devices themselves or their drivers in order to implement zoning. For example, to upgrade a fabric without zoning capability to one with zoning capability only requires the addition of the zone check software. No change to the devices is required.

FIG. 6 is a flow diagram of another preferred method of zoning. In step 600, a source device obtains the address of a destination device. If the two devices are in a common zone, then the source device should be permitted to send a message to the destination device. Otherwise, transmission of the message should be blocked. In step 610, the source device sends a message (i.e., a frame according to the Fibre Channel standard) to the fabric no for routing to the destination device. In step 620, the fabric no performs a zone check to confirm that the source and destination devices are in a common zone. If they are, the message is routed 630 to its final destination. Otherwise, the message is not routed 640. Not routing the message 640 may result in different actions being performed depending on the type of message being sent. For example, when the hardware zone check detects an illegal frame, a Class 3 frame is discarded, whereas a Class 2 frame is given to the switch firmware so that a reject signal can be transmitted to the source device.

The method illustrated in FIG. 6 is preferably implemented in addition to the SNS-based method shown in FIG. 5. This provides additional zoning protection in the event that a fabric device inadvertently obtains the address of a destination device not within its zone. For example, older devices connected to a fabric may not support the SNS function and rely instead on permanent device address lists which may be inconsistent with the actual fabric configuration. In such cases, it is desirable to have an additional method for enforcing zoning.

Within the fabric, the zone check may occur at any or all of a number of locations. For example, referring again to FIG. 4, supposed that device 122 desired to send a message to device 124 in violation of configuration 150. The communications path might be N_Port 480 to F_Port 442 to E_Port 444 to E_Port 424 to F_Port 432 to N_Port 470. The zone check may be performed at many different locations along this path.

In a preferred embodiment of the invention, the zone check is performed at the destination port of the fabric (F_Port 432 in the above example). The zone check preferably is not implemented by the ports on the devices (i.e., the Nx_Ports) because this would require upgrading of all devices in order to implement zoning, as opposed to just upgrading the fabric no. Of the various locations on the fabric no, the source port F_Port 442 and destination port F_Port 432 are preferred because the communications path must contain these two ports. In contrast, the two E_Ports 444 and 424 would be bypassed if the communications path was via switch 450.

Zone checking at the destination port is preferable because it is more important to protect devices from receiving messages sent by other devices outside their zone than it is to prevent devices from sending messages to other devices outside their zone. More specifically, each fabric switch 420, 440, 450 may or may not be zoning-enabled, depending on whether zoning software has been installed on that switch. If a switch is zoning-enabled, the devices connected to it are not expecting to see messages from devices outside of their zones because they expect the switch to enforce zoning. That is, the devices are zoning-aware. However, devices connected to a switch that is not zoning enabled have no such expectations, i.e. they are zoning-unaware. A zoning-unaware device has no knowledge of zoning and is prepared to accept communications from any other device in the fabric system.

When the zone check is performed by the destination port within the fabric communication pathway, a zoning-enabled switch will block improper transmissions from being sent to its attached zoning-aware device, in accordance with the device's expectations. In contrast, a switch which is not zoning-enabled will not block improper transmissions, but this is also in accordance with the destination device's expectations since the destination device is zoning-unaware and is not expecting any screening of transmissions due to zoning.

Now consider the situation when the zone check is performed by the source port. If the switch attached to the source device is zoning-enabled, messages will be properly filtered based upon the enabled zoning configuration. However, if the switch attached to the source device is not zoning-enabled, messages will not be properly filtered. Unfortunately, in this case although the source device is zoning-unaware, the destination device may or may not be zoning-aware. Thus, a zoning-aware destination device may still receive an improper communication.

Referring again to FIG. 4, in a preferred embodiment, the zone check is implemented by a logic device on each FX_Port. There are numerous ways to implement such logic devices, such as Application Specific Integrated Circuits (ASICs), Field Programmable Gate Arrays (FPGAs), Erasable Programmable Read-only Memory (EPROMs), microprocessors or microcontrollers, or Digital Signal Processors (DSPs), including software executing on any of the foregoing. A preferred embodiment uses an ASIC as the logic device. Each ASIC contains fabric zoning configuration information in the form of a table providing a matrix of source and destination devices. Each potential source device and each destination device connected to the port would be contained in the matrix. This matrix is implemented as a bitmap, with a bit to be set or cleared in each position. Permitted source/destination device combinations would have their representative matrix bit set in the bitmap. Each port would contain such a bitmap.

Assume configuration 150 is in effect. As an example, the bitmap for F_Port 432 would contain bits which correspond to each of the other Fx_Ports 422, 442, and 452. The bits for F_Ports 422 and 442 would indicate that F_Port 432 is not permitted to receive communications from these ports; whereas the bit for FL_Port 452 would indicate that F_Port 432 is permitted to receive communications from this port. Each of the ASICs for the other Fx_Ports would contain analogous information. When a message was received by F_Port 432, the zone check would be implemented by referencing the bitmap.

In another embodiment of the method of zone checking illustrated in FIG. 6, the zone check may be performed on the devices themselves as opposed to the fabric. A logic device for performing this zone check could be installed on each device attached to the fabric system. Such a zone check could be performed by either the device sending the message or by the receiving device.

In a preferred embodiment, the basic management of zones and configurations is accomplished in part by a fabric system administrator who logs into a switch on the fabric and inputs zoning commands using a software interface. The administrator may use any switch in the fabric for this purpose because a change made to the zoning information on one switch is propagated throughout all switches in the fabric. Other types of management will be apparent to one of skill in the art. For example, the administrator may work from a dedicated device (e.g., a server dedicated to managing the fabric and/or zoning) rather than through the individual switches, or management functions may be performed automatically by the fabric in response to commands from other computers rather than in response to inputs from a system administrator.

In a preferred embodiment of the invention, zoning management is broken down into the following basic tasks: defining zones, defining zone configurations, and selecting which configuration in a set is to be in effect at any given time. To a certain extent, the software used to implement zoning is flexible in regard to the order in which these steps are performed. For example, it is possible to define a configuration that refers to specific zones that have not yet been defined. The zones may then be defined at a later time, although it is preferable to define the zones before the configuration containing the zones is put into effect. The following paragraphs describe preferred embodiments of each of the basic tasks; other embodiments will be apparent.

Zones preferably are defined by identifying the devices which are members of that zone. Devices are typically identified by Physical Fabric port number, Arbitrated Loop Physical Address (AL_PA), Node Worldwide Name (Node WWN), or Port Worldwide Name (Port WWN). Physical Fabric port numbers are specified as a pair of decimal numbers "s,p" where "s" is the switch number (domain ID from 0 to 31) and "p" is the port number on that switch (0 to 15). For example, "2,12" specifies port 12 on switch number 2. When a zone member is specified by physical fabric port number, then any and all devices connected to that port are in the zone. If this port is an arbitrated loop, then all devices on the loop are in the zone. AL_PA addresses are 8-bit addresses used by private loop devices that operate in a Fibre Channel Private Loop Direct Attach (FC_PLDA) environment. AL_PA is discussed in greater detail in Fibre Channel 2nd Generation Arbitrated Loop (FC-AL-2), revision 6.4 (Project 1133-D), which is incorporated by reference in its entirety herein.

A Worldwide Name uniquely identifies a Fibre Channel node or port on a device. Worldwide Names are specified as eight hex numbers separated by colons, for example "10:00:00:60:69:00:00:8a. When a zone member is specified by Node Worldwide Name then all ports on that device are in the zone. When a zone member is specified by Port Worldwide Name then only that single device port is in the zone. Specifying zone members by Worldwide Name is advantageous because, for example, a device which is so specified may be coupled to the fabric at any point or via any fabric element and it will retain the same zone membership.

The type of zone members used to define a zone may be mixed and matched. For example, a zone defined with the following members: "2,12; 2,14; 10:00:00:60:69:00:00:8a" would contain whichever devices are connected to switch 2, ports 12 and 14, and the device with either the Node Worldwide Name or Port Worldwide Name of "10:00:00:60:69:00:00:8a". Alternatively, a fabric system administrator may assign an alias to a zone to simplify repetitive entry of port numbers, AL_PAs or Worldwide Names. For example, the name "host" could be used as an alias for "10:00:00:60:69:00:00:8a".

Zone configurations preferably are defined by specifying which zones are members of that configuration. For example, zone configuration 150 in FIG. 1 may be defined as "zone_140; zone_142" where zone_140 and zone_142 are zones defined as described in connection with FIG. 1. When a zone configuration is in effect, all zones that are members of that configuration are in effect. As with the definition of zones, common naming conventions, such as aliasing, may also be used with the definition of zone configurations.

More than one zone configuration may be defined for any given fabric. For example, in FIGS. 1 and 2, configurations 150 and 210 are two different zone configurations which may be applied to fabric no. The set of all zone configurations which have been defined for a fabric shall be referred to as the "total defined configuration set."

The actual configuration which is in effect shall be referred to as the "effective configuration." Communications between devices are based on the effective configuration. The effective configuration may be selected by the fabric administrator or it may be programmed into the fabric. For example, in FIGS. 1 and 2, the fabric 110 may be programmed to automatically implement configuration 210 every Saturday from 9-11 pm in order to allow for regularly scheduled maintenance on loop 130 and to implement configuration 150 at all other times.

A configuration is "compiled", or reduced to a form usable by the fabric no, each time that it is put into effect. For example, configuration 210 would be compiled every Saturday around 9 pm shortly before it is placed into effect, and configuration 150 would likewise be compiled every Saturday around 11 pm. The compilation procedure performs a number of functions, such as checking for undefined zone names or other inconsistencies, removing duplicate entries, resolving aliases, and converting Worldwide Names to switch and port addresses if, for example, the fabric routes primarily based on switch and port addresses.

As part of the management function, configurations may also be saved. In a preferred embodiment, saving will store a copy of the current "total defined configuration set" plus the name of the current "effective configuration" into a non-volatile storage medium, such as each switch's flash memory. This "saved configuration set" is automatically reloaded by the fabric switches upon power up, including reinstating the effective configuration from the saved configuration set. Note that the saved configuration set may not reflect the most current total defined configuration set since changes may have been made since the last save.

The zoning commands described above are only one specific embodiment of the zoning management features of the present invention. Other management functions and/or combinations of commands will be apparent. For example, when an administrator is modifying the total defined configuration set, changes may be periodically auto-saved rather than requiring the administrator to affirmatively save any changes. As another example, any number of command sets and user interfaces may be used to implement the basic tasks described above.

Another aspect of zoning management concerns the handling of changes to the fabric. For example, what happens to zoning when devices are added to the fabric, or if multiple fabrics are merged into a single fabric. The switch or fabric to be added may either be new, meaning it has no pre-existing zoning information, or it may contain a previously defined set of zone configuration data. The following paragraphs describe preferred embodiments for handling these situations, although other embodiments will be apparent.

If a new switch is added to a fabric, zoning information is copied from the fabric into the new switch. If a zone configuration is enabled in the fabric, then the same configuration becomes enabled in the new switch. Adding a new fabric (i.e., a fabric in which all the switches have no pre-existing zoning information) to an existing zoned fabric is very similar to adding a new switch. Zoning information is copied from the existing zoned fabric into the switches of the new fabric. If a zone configuration is enabled, then the same configuration becomes enabled in the new fabric switches.

If two fabrics that both contain some existing zone configuration information are joined, then the situation is more complex. The zoning software will attempt to merge the two sets of zone configuration data together, but this is only possible if the two sets of data are compatible. The simplest case is where both fabrics have identical zone configuration data and the same configuration is enabled. In this case, the fabrics are compatible and they will join to make one larger fabric with the same zone configuration in effect across the whole new fabric. If the fabrics have different zone configuration data, then the two sets of zoning information will be checked for compatibility and merged if possible.

If a merge is not possible because the two zoning configuration data sets are incompatible, the fabric will be segmented. A merge is not possible, for example, if the two zone configurations that are enabled are different, if different names are used by each fabric to refer to the same zone, or if a zone with the same name in each fabric contains different groups of devices in each fabric. If the merge is not possible, then the fabric is logically segmented into two separate fabrics even though physically is it connected as a single fabric. Each of the two new fabrics retains its original zone configuration.

Zones may also be configured to allow access between devices for only certain types of communication. For example, a zone may be configured to permit read-only access between devices, as opposed to the default read-write access generally permitted between devices within the same zone. Alternately, zones may also be configured as protocol zones, which restrict all devices within a zone to utilizing the same communications protocol. Such zone types may be implemented in a number of ways. For example, referring to the previously described embodiment based on the SNS and additional zoning software, the zoning software may be modified to differentiate between zone types (e.g., normal, read-only, or protocol) and the SNS may respond to a query for addresses by providing a list of other devices, including both address and type of communication. Similar changes may be made to the other embodiments described above.

Although the invention has been described in considerable detail with reference to certain preferred embodiments, other embodiments are possible. For example, zoning could be implemented via a centralized, versus distributed, method. In the previously described distributed method of implementing zoning, the zoning information is propagated to each switch. However, this zoning information could also be contained and accessed in a centralized way, such as via a central zoning server for the entire fabric system. Therefore, the scope of the appended claims should not be limited to the description of the preferred embodiments contained herein.

The invention claimed is:

1. A method of operating a first node device coupled to a fabric, the fabric having a plurality of coupled node devices, with at least two zones defined to include at least one node device as a member of each zone, the method of operating the first node device comprising:
   querying the fabric, using a Fibre Channel command, for a list of addresses of other node devices coupled to the fabric; and
   receiving a list of only the addresses of other node devices which are in a common zone with the first node device.

2. The method of claim 1, wherein said querying step occurs when the first node device is coupled to the fabric.

3. The method of claim 1, further comprising:
   receiving an instruction to perform the querying step an additional time.

4. The method of claim 1, wherein the querying step is directed to a simple name server.

5. A method of operating a first node device, comprising:
   querying a fabric, using a Fibre Channel command, for a list of addresses of other node devices coupled to the fabric; and
   receiving a list of only the addresses of other node devices which are in a common zone of at least two zones with the first node device.

6. The method of claim 5, wherein said querying step occurs when the first node device is coupled to the fabric.

7. The method of claim 5, further comprising:
   receiving an instruction to perform the querying step an additional time.

8. The method of claim 5, wherein the querying step is directed to a simple name server.

9. A method of operating a first node device coupled to a fabric, the fabric having a plurality of coupled node devices, with at least two zones defined to include at least one node device as a member of each zone, the method of operating the first node device comprising:
   providing a Fibre Channel-based query to the fabric for a list of addresses of other node devices coupled to the fabric; and
   receiving a list of only the addresses of other node devices which are in a common zone with the first node device.

10. The method of claim 9, wherein said querying step occurs when the first node device is coupled to the fabric.

11. The method of claim 9, further comprising:
   receiving an instruction to perform the querying step an additional time.

12. The method of claim 9, wherein the querying step is directed to a simple name server.

13. A method of operating a first node device, comprising:
   providing a Fibre Channel-based query to a fabric for a list of addresses of other node devices coupled to the fabric; and
   receiving a list of only the addresses of other node devices which are in a common zone of at least two zones with the first node device.

14. The method of claim 13, wherein said querying step occurs when the first node device is coupled to the fabric.

15. The method of claim 13, further comprising:
   receiving an instruction to perform the querying step an additional time.

16. The method of claim 13, wherein the querying step is directed to a simple name server.

* * * * *